(12) United States Patent
Lun et al.

(10) Patent No.: US 11,608,872 B2
(45) Date of Patent: Mar. 21, 2023

(54) DAMPER ASSEMBLY AND A HOUSING FOR THE DAMPER ASSEMBLY

(71) Applicant: BeijingWest Industries Co., Ltd., Beijing (CN)

(72) Inventors: Saiman Lun, Centerville, OH (US); Philippe Dellac, Sartrouville (FR); Michal Ptak, Cracow (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 120 days.

(21) Appl. No.: 17/180,837

(22) Filed: Feb. 21, 2021

(65) Prior Publication Data

US 2021/0262546 A1 Aug. 26, 2021

Related U.S. Application Data

(60) Provisional application No. 62/981,423, filed on Feb. 25, 2020.

(30) Foreign Application Priority Data

Dec. 4, 2020 (CN) .......................... 202011403810.3

(51) Int. Cl.
*F16F 9/32* (2006.01)
*F16F 9/18* (2006.01)
(Continued)

(52) U.S. Cl.
CPC .............. *F16F 9/3235* (2013.01); *F16F 9/18* (2013.01); *F16F 9/364* (2013.01); *F16F 9/483* (2013.01);
(Continued)

(58) Field of Classification Search
CPC .. F16F 9/3235; F16F 9/18; F16F 9/364; F16F 9/483; F16F 9/50; F16F 2222/12;
(Continued)

(56) References Cited

U.S. PATENT DOCUMENTS

| 2,107,974 A | 5/1935 | Bechereau |
| 5,848,676 A * | 12/1998 | Deigner ............. B60G 21/0553 |
| | | 188/322.19 |

(Continued)

FOREIGN PATENT DOCUMENTS

| CN | 103953676 A | 7/2014 |
| CN | 104121317 A | 10/2014 |

(Continued)

OTHER PUBLICATIONS

First Office Action and search report dated Dec. 28, 2021 for counterpart Chinese patent application No. 202011403810.3, along with machine EN translation downloaded from EPO.

(Continued)

*Primary Examiner* — Robert A. Siconolfi
*Assistant Examiner* — James K Hsiao
(74) *Attorney, Agent, or Firm* — William H. Honaker; Dickinson Wright PLLC

(57) ABSTRACT

A damper assembly comprises a main tube defining a fluid chamber. The main tube includes a first section, a second section, and an intermediate portion. A sleeve is disposed about the main tube. An external tube is disposed about the main tube and the sleeve. The external tube defines a compensation chamber between the sleeve and the external tube. A main piston divides the fluid chamber into a rebound chamber and a compression chamber. A piston rod couples to the main piston for moving the main piston between a compression stroke and a rebound stroke. The sleeve is in an abutment relationship with the second section of the main tube, radially spaced apart from the first section of the main tube, defining a compartment extending between the sleeve and the first section of the main tube. A housing for the damper assembly is also disclosed herein.

17 Claims, 5 Drawing Sheets

(51) Int. Cl.
*B60G 13/08* (2006.01)
*B60G 17/08* (2006.01)
*F16F 9/36* (2006.01)
*F16F 9/48* (2006.01)
*F16F 9/50* (2006.01)

(52) U.S. Cl.
CPC .............. *B60G 13/08* (2013.01); *B60G 17/08* (2013.01); *B60G 2202/24* (2013.01); *B60G 2204/62* (2013.01); *B60G 2206/41* (2013.01); *B60G 2206/82092* (2013.01); *B60G 2500/104* (2013.01); *B60G 2800/162* (2013.01); *F16F 9/50* (2013.01); *F16F 2222/12* (2013.01); *F16F 2226/045* (2013.01); *F16F 2228/066* (2013.01); *F16F 2230/0023* (2013.01); *F16F 2232/08* (2013.01); *F16F 2234/02* (2013.01)

(58) Field of Classification Search
CPC .......... F16F 2226/045; F16F 2228/066; F16F 2230/0023; F16F 2232/08; F16F 2234/02; B60G 13/08; B60G 2202/24; B60G 17/08; B60G 2204/62; B60G 2206/41; B60G 2206/82092; B60G 2500/104; B60G 2800/162
See application file for complete search history.

(56) References Cited

U.S. PATENT DOCUMENTS

| | | | |
|---|---|---|---|
| 9,291,229 B2 | 3/2016 | Shibahara | |
| 9,309,948 B2 | 4/2016 | Katayama et al. | |
| 9,822,837 B2 | 11/2017 | Groves et al. | |
| 2005/0183912 A1* | 8/2005 | Peuker | D06F 37/20 188/322.16 |
| 2010/0170391 A1* | 7/2010 | Van der Blom | F04B 53/143 188/266 |
| 2016/0052361 A1* | 2/2016 | Yamashita | F16F 9/50 188/266.1 |
| 2016/0223045 A1 | 8/2016 | Baldoni et al. | |
| 2018/0058533 A1* | 3/2018 | Bruno | F16F 9/49 |
| 2018/0119770 A1* | 5/2018 | Bruno | F16F 9/49 |
| 2018/0223942 A1* | 8/2018 | Kus | F16F 9/3465 |
| 2019/0016241 A1* | 1/2019 | Kozhipuram | F16F 9/34 |
| 2019/0186584 A1* | 6/2019 | Flacht | F16F 9/165 |
| 2020/0256420 A1* | 8/2020 | Mallin | F16F 9/49 |
| 2020/0400207 A1* | 12/2020 | Bruno | F16F 9/064 |

FOREIGN PATENT DOCUMENTS

| | | |
|---|---|---|
| CN | 106907421 A | 6/2017 |
| CN | 108050195 A | 5/2018 |
| CN | 108547906 A | 9/2018 |
| CN | 108757811 A | 11/2018 |
| CN | 110206844 A | 9/2019 |
| CN | 110785579 A | 2/2020 |
| DE | 102006014463 A1 | 8/2007 |
| EP | 2163784 A1 | 3/2010 |
| EP | 3607222 A1 | 9/2016 |
| KR | 20170050040 A | 5/2017 |

OTHER PUBLICATIONS

Extended European Search Report dated Jul. 28, 2021 for counterpart European patent application No. 21158132.7.

* cited by examiner

DAMPER ASSEMBLY AND A HOUSING FOR THE DAMPER ASSEMBLY

CROSS REFERENCE TO RELATED APPLICATION

The present application claims the benefit of U.S. Provisional Patent Application Ser. No. 62/981,423, filed on Feb. 25, 2020, and Chinese Application No. 202011403810.3 filed on Dec. 4, 2020, the entire disclosures of which are hereby incorporated herein by reference.

BACKGROUND OF THE INVENTION

1. Field of the Invention

The present invention relates generally to a damper assembly and a housing for the damper assembly.

2. Description of the Prior Art

There are a variety of dampers in automotive suspensions, including a mono-tube type strut, a twin-tube type dampers, and a triple-tube type dampers. Within each variation, there are variations with valve arrangement and fluid management. The triple-tube type damper construction includes tube and valve arrangement that allows for fluid flow within the damper that is generally in a single direction for both the compression and rebound direction of the suspension damper, whereas both mono-tube and twin-tube type dampers require fluid to flow in different directions for the compression and rebound directions. This single-direction property of the triple-tube type damper allows for damping control of the fluid flow within the triple-tube type damper to be localized to one general area within the damper for both compression and rebound directions. As a result, conventional semi-active or continuously variable damping control systems typically utilize the triple-tube type strut and a single active solenoid valve to control damping force for both the compression and rebound directions of the strut.

Electrically Controlled hydraulic dampers (shock absorbers and struts) for vehicular suspension systems are well-known. Many controllable shock absorbers utilize an electric solenoid or motor-driven member to select different damping characteristics. Due to small electric actuators and the high friction of the movable members, many known controllable dampers are limited in response time, and are not suitable for real time systems. A particular damping setting, once selected, cannot be changed quickly enough to respond to the next individual suspension movement. In addition, many devices select from a limited group of discrete settings and are not capable of providing continuously variable damping.

One such a damper assembly is disclosed in Korean Patent Application KR20170050040. The damper assembly comprises a main tube extending along on a center axis between a first end and a second end. The main tube defines a fluid chamber extending between the first end and the second end for containing a working fluid. A sleeve is disposed about the main tube and extending along the center axis between a primary end and a secondary end. The primary end is adjacent to the first end. The secondary end is adjacent to the second end. An external tube is disposed on the center axis, radially spaced from the sleeve, extending about the main tube between a closed end and an opened end. The closed end is adjacent the primary end. The opened end is adjacent to the secondary end. The external tube defines a compensation chamber extending about the center axis between the sleeve and the external tube. A piston rod guide is located at the second end of the main tube and in sealing engagement with the main tube, the sleeve, and the external tube to close the fluid chamber and the compensation chamber. A main piston is slidably disposed in the fluid chamber and movable along the center axis dividing the fluid chamber into a rebound chamber and a compression chamber. A piston rod extends along the center axis and coupled to the main piston for moving the main piston between a compression stroke and a rebound stroke.

SUMMARY OF THE INVENTION

The present invention in its broadest aspect provides a damper assembly having a simplistic design thereby reducing the manufacturing cost for the damper assembly. The present invention also minimizes fluid flow distance in the compartment of the damper assembly to reduce flow restrictions. In addition, the present invention provides a damper assembly having an improved operation life by preventing damages to the main piston. Furthermore, the present invention eliminates air entrapment in the damper assembly.

It is one aspect of the present invention to provide a housing for a damper assembly. The housing comprises a main tube extending along on a center axis. The main tube defines a fluid chamber for containing a working fluid. The main tube includes a first section, a second section, and an intermediate portion. The first section having a first predetermined diameter and the second section having a second predetermined diameter wherein the second predetermined diameter is greater than the first predetermined diameter. The intermediate portion connects the first section to the second section at a predetermined angle relative to the center axis. A sleeve is disposed about the main tube and extending along the center axis. An external tube is disposed on the center axis and radially spaced from the sleeve. The external tube extends about the sleeve and the main tube. The sleeve is in an abutment relationship with the second section of the main tube and radially spaced apart from the first section of the main tube defining a compartment extending between the sleeve and the first section of the main tube.

It is another aspect of the present invention to provide a damper assembly. The damper assembly comprises a main tube extending along on a center axis between a first end and a second end. The main tube defines a fluid chamber extending between the first end and the second end for containing a working fluid. The main tube including a first section, a second section, and an intermediate portion. The first section has a first predetermined diameter and the second section has a second predetermined diameter wherein the second predetermined diameter is greater than the first predetermined diameter. The intermediate portion connects the first section to the second section at a predetermined angle relative to the center axis. A sleeve is disposed about the main tube and extending along the center axis between a primary end and a secondary end. The primary end is adjacent to the first end. The secondary end is adjacent to the second end. An external tube is disposed on the center axis, radially spaced from the sleeve, extending about the main tube between a closed end and an opened end. The closed end is adjacent the primary end. The opened end is adjacent to the secondary end. The external tube defines a compensation chamber extending about the center axis between the sleeve and the external tube. A piston rod guide is located at the second end of the main tube and in sealing engagement with the main tube, the sleeve, and the external tube to close the fluid chamber and the compensation chamber. A main piston is slidably disposed in the fluid chamber and movable along the center axis dividing the fluid chamber into a rebound chamber and a compression chamber. A piston rod extends along the center axis and coupled to the main piston for moving the main piston between a compression stroke and a rebound stroke. The sleeve is in an abutment relationship with the second section of the main tube, radially spaced apart from the first section of the main tube, defining a compartment extending between the sleeve and the first section of the main tube.

It is another aspect of the present invention to provide a damper assembly. The damper assembly comprises a main tube extending along on a center axis between a first end and a second end. The main tube defines a fluid chamber extending between the first end and the second end for containing a working fluid. The main tube includes a first section, a second section, and an intermediate portion. The first section has a first predetermined diameter and the second section has a second predetermined diameter wherein the second predetermined diameter is greater than the first predetermined diameter. The intermediate portion connects the first section to the second section at a predetermined angle relative to the center axis. A sleeve is disposed about the main tube extending along the center axis between a primary end and a secondary end. The primary end is adjacent to the first end. The secondary end is adjacent to the second end. An external tube is disposed on the center axis, radially spaced from the sleeve, extending about the main tube between a closed end and an opened end. The closed end is adjacent the primary end. The opened end is adjacent to the secondary end. The external tube defines a compensation chamber extending about the center axis between the sleeve and the external tube. A piston rod guide is located at the second end of the main tube and in sealing engagement with the main tube, the sleeve, and the external tube to close the fluid chamber and the compensation chamber. A main piston is slidably disposed in the fluid chamber and movable along the center axis dividing the fluid chamber into a rebound chamber and a compression chamber. A piston rod extends along the center axis and coupled to the main piston for moving the main piston between a compression stroke and a rebound stroke. The sleeve is in an abutment relationship with the second section of the main tube, radially spaced apart from the first section of the main tube, defining a compartment extending between the sleeve and the first section of the main tube. The intermediate portion of the main tube defines at least one orifice located on the intermediate portion for allowing fluid communication between the fluid chamber and the compartment. The sleeve defines an aperture in fluid communication with the compartment and located radially spaced from the first section of the main tube. A distance between the at least one orifice and the aperture is less than a distance between the aperture and the primary end of the sleeve.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
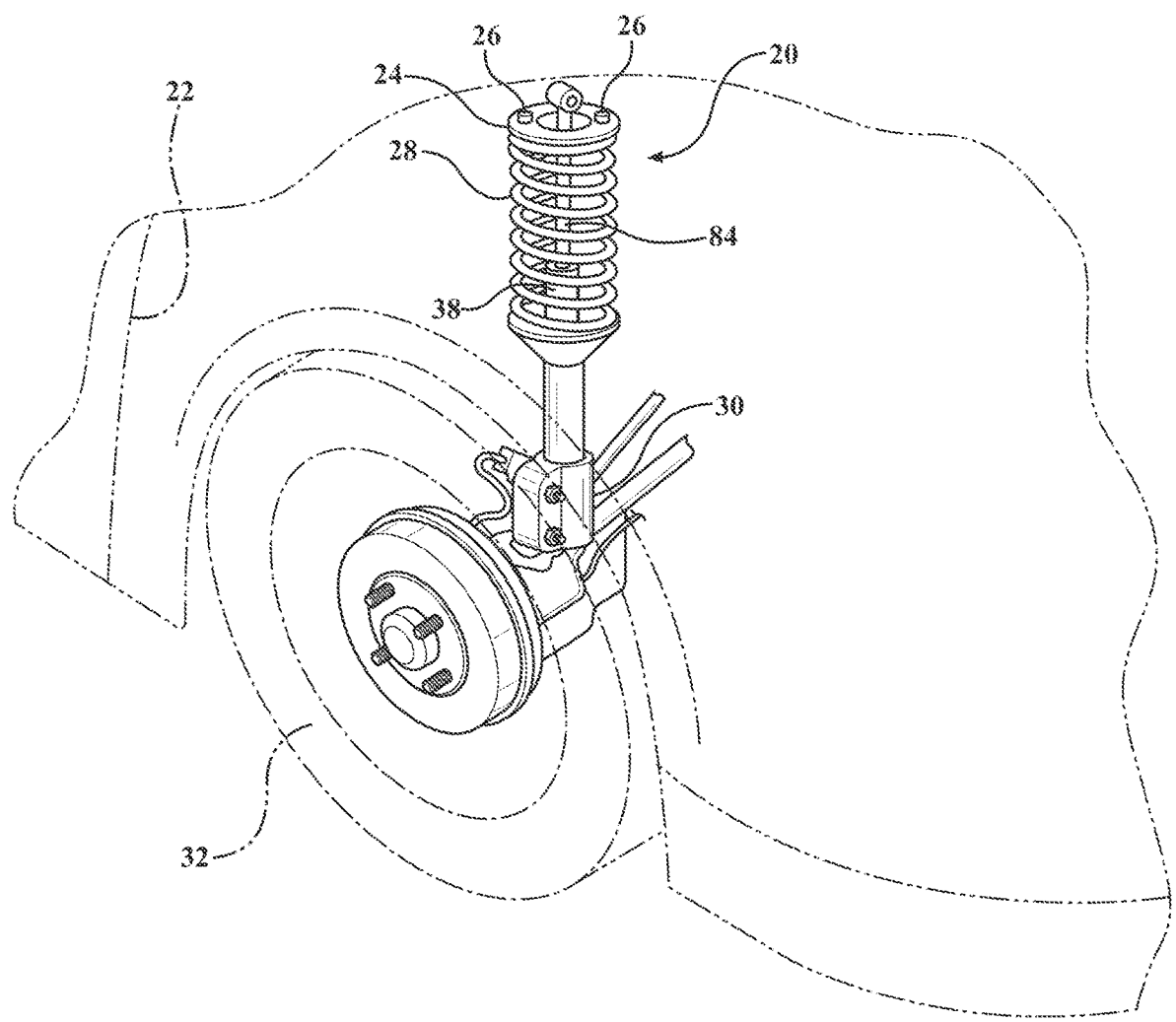
FIG. 1 is a fragmentary view of a vehicle suspension including the controlled damper assembly constructed in accordance with an embodiment of the present invention.

Referring to the Figures, wherein like numerals indicate corresponding parts throughout the several views, a damper assembly 20 for use in a vehicle constructed in accordance with one embodiment of the present invention is generally shown in FIG. 1.

FIG. 1 illustrates a fragment of an exemplary vehicle suspension including the damper assembly 20 being attached to a vehicle chassis 22 via a top mount 24 and a number of screws 26 disposed on a periphery of an upper surface of the top mount 24. The top mount 24 connects to a coil spring 28. The damper assembly 20 connects to the steering knuckle 30 supporting vehicle wheel 32.

Figure 2:
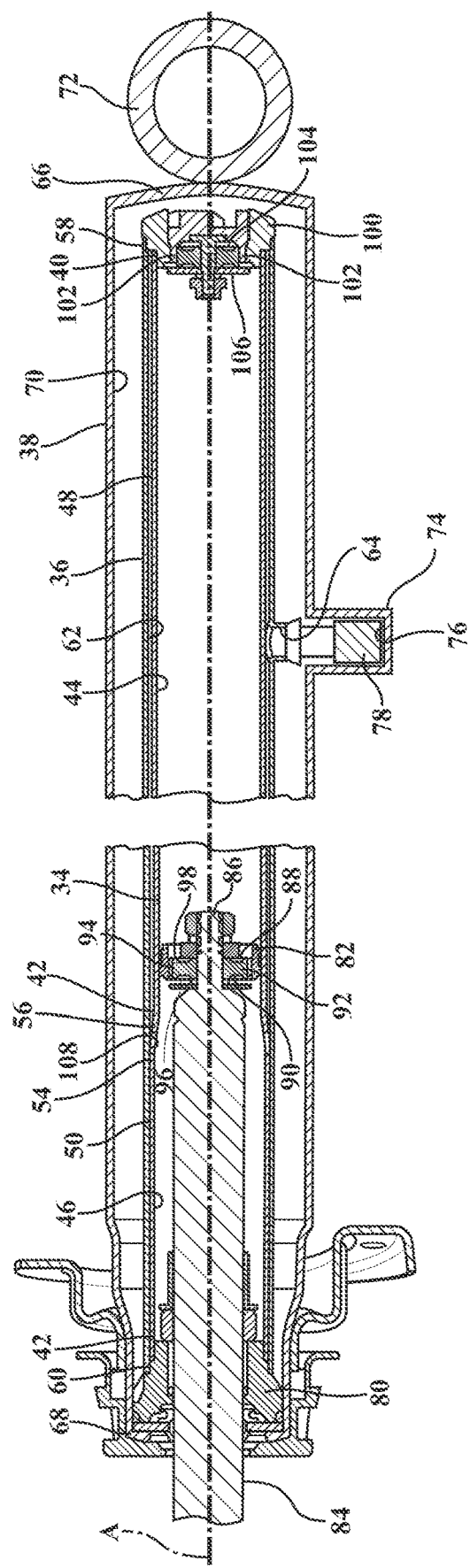
FIG. 2 is a cross-sectional perspective view of the controlled damper assembly constructed in accordance with an embodiment of the present invention.

As best shown in FIG. 2, the damper assembly 20 comprises a housing 34, 36, 38. The housing 34, 36, 38 includes a main tube 34, a sleeve 36, and an external tube 38 disposed in a concentric relationship with one another. The main tube 34, having a generally cylindrical shape, extends along a center axis between a first end 40 and a second end 42. The main tube 34 defines a fluid chamber 44, 46 extending along the center axis A between the first end 40 and the second end 42 for containing a working fluid. The main tube 34 includes a first section 48 and a second section 50. The first section 48 and the second section 50, each having a generally cylindrical shape, are axially spaced apart from one another extending along the center axis A. The first section 48 has a first predetermined diameter $D_1$ and extends from the first end 40 of the main tube 34 to a first intermediate end 52. The second section 50, having a second predetermined diameter $D_2$, extends from the second end 42 of the main tube 34 to a second intermediate end 54. The first intermediate end 52 and the second intermediate end 54 are axially spaced apart from one another. According to an embodiment of the present invention, the second predetermined diameter $D_2$ is greater than the first predetermined diameter $D_1$. An intermediate portion 56 extends from the first intermediate end 52 to the second intermediate end 54 and flaring outwardly from the center axis A at a predetermined angle α to connect the first section 48 and the second section 50. According to an embodiment of the present invention, the predetermined angle α is less than 90°. In other words, the intermediate portion 56 extends from the first section 48 to the second section 50 at the predetermined angle α to allow for a smooth transition from the first section 48, having the smaller second predetermined diameter $D_1$, to the second section 50.

Figure 3:
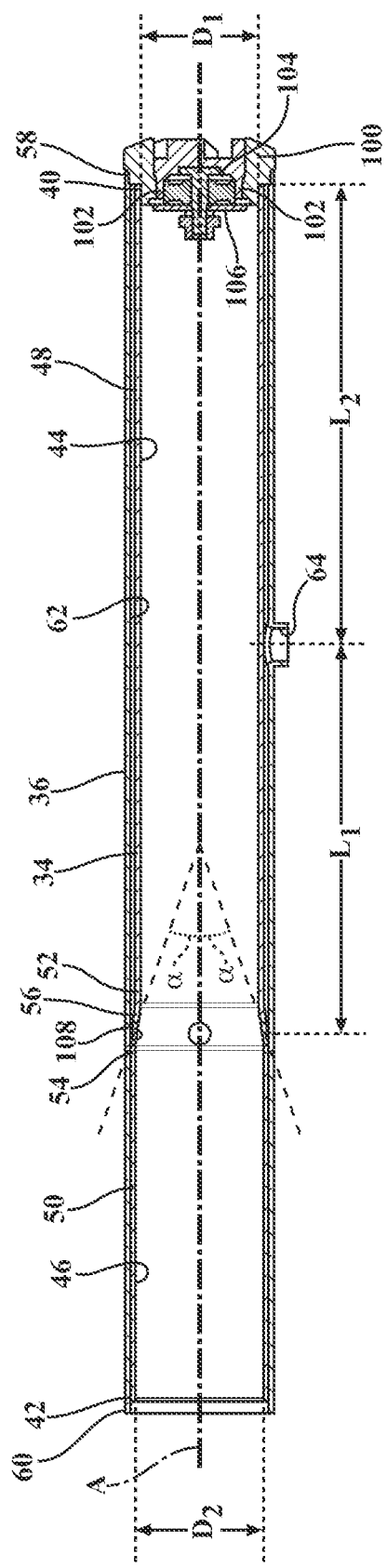
FIG. 3 is a cross-sectional perspective view of a main tube and a sleeve of the controlled damper assembly constructed in accordance with an embodiment of the present invention.

As best illustrated in FIG. 3, the sleeve 36, having a generally cylindrical shape, is disposed about the main tube 34. The sleeve 36 extends along the center axis A between a primary end 58 and a secondary end 60. The primary end 58 is located adjacent to the first end 40 of the main tube 34.

The secondary end 60 is adjacent to the second end 42 of the main tube 34. The sleeve 36 is spaced from the first section 48 of the main tube 34 defining a compartment 62 extending about the center axis A between the sleeve 36 and the first section 48 of the main tube 34. The sleeve 36 defines an aperture 64 in fluid communication with the compartment 62 and located radially spaced from the first section 48 of the main tube 34.

The external tube 38, having a generally cylindrical shape, is disposed on the center axis A radially spaced from the sleeve 36. The sleeve 36 extends about the main tube 34 between a closed end 66 and an opened end 68. The closed end 66 is located adjacent the primary end 58 of the sleeve 36. The opened end 68 is adjacent to the secondary end 60 of the sleeve 36. The external tube 38 and the sleeve 36 define a compensation chamber 70 extending between the external tube 38 and the sleeve 36 and annularly about the center axis A. A mounting ring 72, located at the closed end 66 of the external tube 38, couples to the closed end 66 of the external tube 38 for coupling the damper assembly 20 to the vehicle.

According to an embodiment of the present invention, the external tube 38 includes a protrusion 74. The protrusion 74, having a generally cylindrical shape and located adjacent to the closed end 66, extends radially outwardly from the external tube 38 in a perpendicular relationship with the center axis A. The protrusion 74 defines a channel 76 extending along the protrusion 74 and in fluid communication with the compensation chamber 70 and in co-axial alignment with the aperture 64. An actuator 78 is located in the channel 76 and coupled to the protrusion 74 for regulating fluid flow from the compartment 62 to the compensation chamber 70. The actuator 78 is movable between an extended position and a retracted position. In the the extended position, the actuator 78 is in an abutment relationship with the sleeve 36 and the aperture 64 to block fluid flow through the compartment 62. In the retracted position, the actuator 78 is radially spaced from the aperture 64 to allow fluid flow from the compartment 62 to the compensation chamber 70. According to an embodiment of the present invention, the actuator 78 can include a motor and an engagement member driven by the motor for movement between the extended position and the retracted position. According to an embodiment of the present invention, the actuator 78 can include a solenoid valve for regulating fluid flow from the compartment 62 to the compensation chamber 70.

Figure 4:
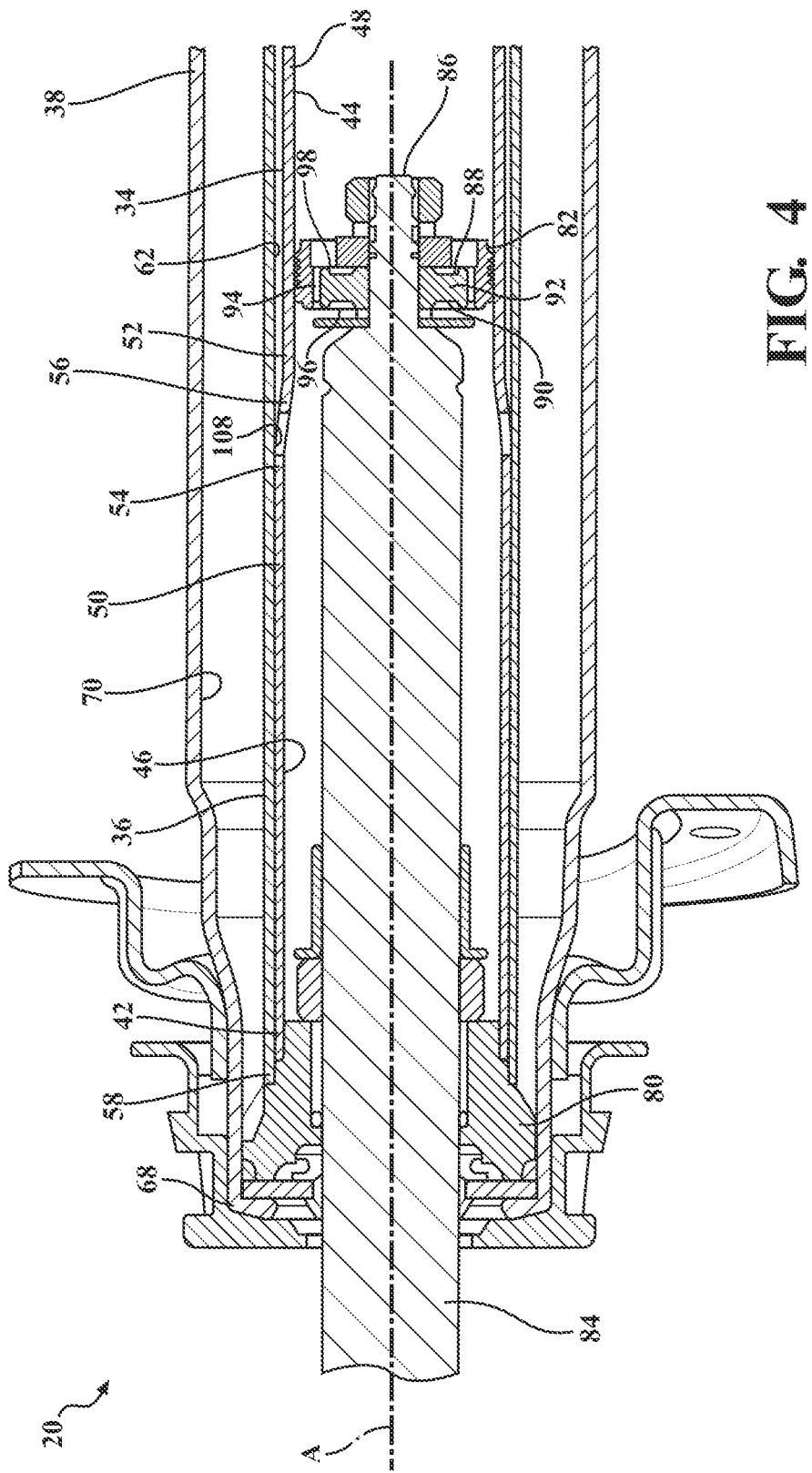
FIG. 4 is an enlarged fragmentary view of a piston rod, a main piston, and a rod guide constructed in accordance with an embodiment of the present invention.

As best shown in FIG. 4, a piston rod guide 80 is disposed at the second end 42 of the main tube 34 and the opened end 68 of the external tube 38 and in sealing engagement with the main tube 34, the sleeve 36, and the external tube 38 to close the fluid chamber 44, 46 and the compensation chamber 70. A main piston 82, having a generally cylindrical shape, is slidably disposed in the fluid chamber 44, 46 and movable along the center axis A dividing the fluid chamber 44, 46 into a compression chamber 44 and a rebound chamber 46. The compression chamber 44 extends between the first end 40 and the main piston 80 and in fluid communication with the compensation chamber 70. The rebound chamber 46 extends between the second end 42 and the main piston 82. A piston rod 84, having a generally cylindrical shape, extends along the center axis A through the main piston 82 to a distal end 86 spaced from the main piston 82 for moving the main piston 82 between a compression stroke and a rebound stroke. During the compression stroke, the piston rod 84 and the main piston 82 move toward the first end 40 of the main tube 34 and the closed end 66 of the external tube 38. During the rebound stroke, the piston rod 84 and the main piston 82 move toward the second end 42 of the main tube 34 and the opened end 68 of the external tube 38.

The main piston 82 has a compression surface 88 and a rebound surface 90. The compression surface 88 is located in the compression chamber 44 facing the closed end 66. The rebound surface 90 is located in the rebound chamber 46 facing the opened end 68. The main piston 82 defines a plurality of passages 92, 94 including a set of inner passages 92 and a set of outer passage 94 for allowing the working fluid to flow through the main piston 82 during the compression stroke or the rebound stroke. The inner passages 92 are disposed adjacent to the center axis A and extending between the rebound surface 90 and the compression surface 88. The outer passages 94, radially spaced from the inner passages 92, extend between the rebound surface 90 and the compression surface 88.

A first compression valve 96 including a plurality of discs, each having a generally circular shape, is disposed on the rebound surface 90 of the main piston 82 covering the outer passages 94 for limiting the flow of the working fluid through the main piston 82 to provide a damping force during the compression stroke. A first rebound valve 98 including a plurality of discs, each having a generally circular shape, is disposed on the compression surface 88 of the main piston 82 covering the inner passages 92 for limiting the flow of the working fluid through the main piston 82 to provide a damping force during the rebound stroke.

A base valve 100, located in the compression chamber 44, couples to the first end 40 of the main tube 34 and the primary end 58 of the sleeve 36. The base valve 100 defines a plurality of conduits 102 in fluid communication between the compression chamber 46 and the compensation chamber 70. A second compression valve 104 and a second rebound valve 106 attach to the base valve 100 to limit fluid flow from the fluid chamber 40, 42 to the compensation chamber 70 during the compression stroke and the rebound stroke. The second compression valve 104 including a plurality of discs, each having a generally circular shape, is disposed in the rebound chamber 46 and covering the conduits 102 for limiting the flow of the working fluid to the compensation chamber 70 during the compression stroke to provide additional damping force during the compression stroke. The second rebound valve 106 including a plurality of discs, each having a generally circular shape, is disposed in the compensation chamber 70 adjacent to the closed end 66 of the external tube 64 covering the conduits 102 for limiting the flow of the working fluid to the compensation chamber 70 during the rebound stroke to provide additional damping force during the rebound stroke.

Referring back to FIGS. 2 and 3, the sleeve 36 is in an abutment relationship with the second section 50 of the main tube 34 and radially spaced apart from the first section 48 of the main tube 34 defining the compartment 62 extending between the sleeve 36 and the first section 48 of the main tube 34. In other words, a portion of the sleeve 36 is in an abutment relationship with the second section 50 of the main tube 34 while a portion of the sleeve 36 is radially spaced from the first section 48 of the main tube 34 defining the compartment 62 extending about the center axis A and between the sleeve 36 and the first section 48 of the main tube 34. This arrangement allows the sleeve 54 is slip-fitted onto the main tube 34 when assembling the controlled damper assembly 20. Because of the slip-fit engagement, the present invention eliminates complex sealing features that are typically present on the sleeve 34. At the same time, the slip-fit engagement allows for proper alignment between the main tube 34 and the sleeve 36 when assembling the damper assembly 20 as well as eliminate air entrapment in the damper assembly 20.

The intermediate portion 56 of the main tube 34 defines at least one orifice 108 located on the intermediate portion 56 for allowing fluid communication between the fluid chamber 44, 46 and the compartment 62. According to an embodiment of the present invention, the at least one orifice 108 includes a plurality of orifices 108, e.g. four orifices 108, located on the intermediate portion 56, disposed about the center axis A and circumferentially spaced from one another. According to an embodiment of the present invention, each orifice 108 of the plurality of orifices 108 is oriented 90° apart from an adjacent orifice 108 of the plurality of orifices 108. The at least one orifice 108 allows the working fluid to flow from the fluid chamber 44, 46 to the compartment 62 during the compression stroke and the rebound stroke thereby preventing fluid pressure build up at the intermediate portion 56 as the main piston 82 moves in the fluid chamber 44, 46 during the compression stroke and the rebound stroke. As the main piston 82 moves in the fluid chamber 44, 46, the fluid pressure build up in the main tube 34 is able to escape to from the fluid chamber 44, 46 to the compartment 62 via the at least one orifice 108 to prevent potential damage to the main piston 82 thereby improving the operational life of the damper assembly 20.

According to an embodiment of the present invention, the at least one orifices 108 is located above the main piston 82 during a full rebound stroke. Accordingly, this arrangement minimizes the distance between the main piston 82 and the at least one orifice 108. A distance $L_1$ between the at least one orifice 108 and the aperture 64 is less than a distance $L_2$ between the aperture 64 and the primary end 58 of the sleeve 36. This reduces fluid travel distance from the compartment 62 to the aperture 64 thereby allowing the actuator 78 to quickly release the fluid pressure in the compartment 62 by moving from the extended position to the retracted position.

Figure 5:
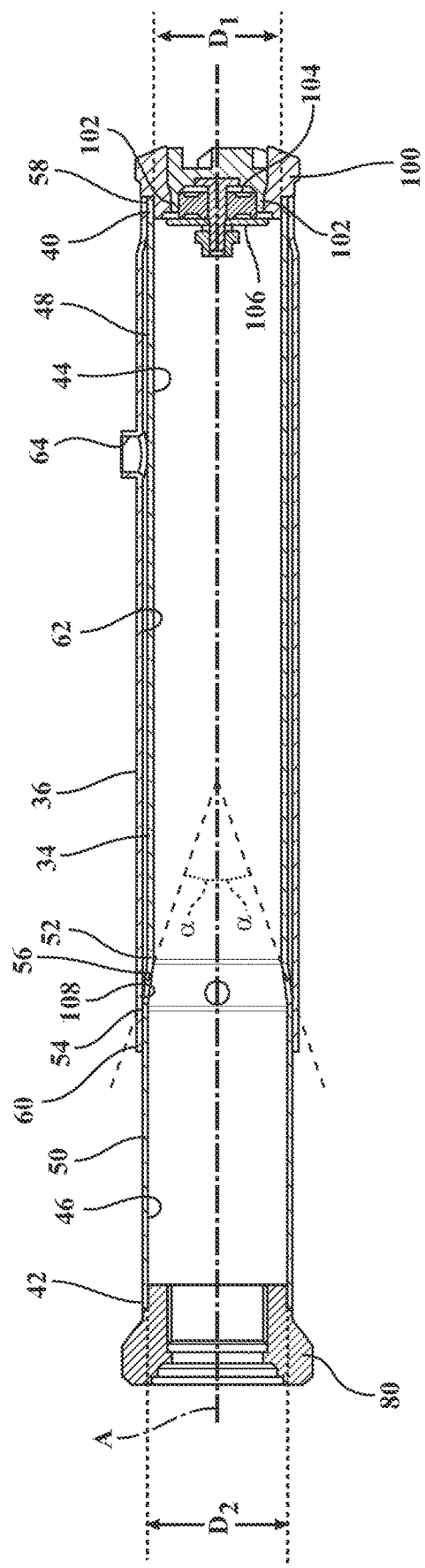
FIG. 5 is a cross-sectional perspective view of a main tube and a sleeve of the controlled damper assembly constructed in accordance with another embodiment of the present invention.

FIG. 5 shows the housing 34, 36, 38 of the damper assembly 20 constructed in accordance with another embodiment of the present invention. The housing 34, 36, 38 includes a main tube 34, a sleeve 36, and an external tube (not shown) disposed in a concentric relationship with one another. The main tube 34, having a generally cylindrical shape, extends along a center axis between a first end 40 and a second end 42. The main tube 34 defines a fluid chamber 44, 46 extending along the center axis A between the first end 40 and the second end 42 for containing a working fluid. The main tube 34 includes a first section 48 and a second section 50. The first section 48 and the second section 50, each having a generally cylindrical shape, are axially spaced apart from one another extending along the center axis A. The first section 48 has a first predetermined diameter $D_1$ and extends from the first end 40 of the main tube 34 to a first intermediate end 52. The second section 50, having a second predetermined diameter $D_2$, extends from the second end 42 of the main tube 34 to a second intermediate end 54. The first intermediate end 52 and the second intermediate end 54 are axially spaced apart from one another. According to an embodiment of the present invention, the second predetermined diameter $D_2$ is greater than the first predetermined diameter $D_1$. An intermediate portion 56 extends from the first intermediate end 52 to the second intermediate end 54 and flaring outwardly from the center axis A at a predetermined angle α to connect the first section 48 and the second section 50. According to an embodiment of the present invention, the predetermined angle α is less than 90°. In other words, the intermediate portion 56 extends from the first section 48 to the second section 50 at the predetermined angle α to allow for a smooth transition from the first section 48, having the smaller second predetermined diameter $D_1$, to the second section 50.

The sleeve 36, having a generally cylindrical shape, is disposed about the main tube 34. The sleeve 36 extends along the center axis A between a primary end 58 and a secondary end 60. The primary end 58 is located adjacent to the first end 40 of the main tube 34. The secondary end 60 is adjacent to the second intermediate end 54 of the main tube 34. The sleeve 36 is spaced from the first section 48 and the second section 50 of the main tube 34 defining a compartment 62 extending about the center axis A between the sleeve 36 and the first section 48 of the main tube 34. The primary end 58 of the sleeve 36 is press-fitted against the first end of the main tube 34 or the base valve 100 for reducing the flow restriction around the base valve 100. The secondary end 60 of the sleeve 36 is press-fitted against the second section 50 of the main tube 34 to secure the sleeve 36 to the main tube 34. This embodiment of the present invention reduces the amount of material for manufacturing the sleeve 36 thereby reducing the mass and the overall cost of making the damper assembly 20. Additionally, with the sleeve 36 being spaced from both the first section 48 and the second section 50, the volume of the compartment 62 also increases which allows the compartment 62 accommodate for more fluid/gas generated during the compression stroke or the rebound stroke. The sleeve 36 defines an aperture 64 in fluid communication with the compartment 62 and located radially spaced from the first section 48 of the main tube 34. Laser weld or resistance weld can also be used to couple the sleeve 36 to the main tube 34.

In operation, during the compression stroke, as the piston rod 84 and the main piston 82 move toward the first end 40 of the main tube 34, the working fluid contained in the compression chamber 44 is compressed and pushed to the rebound chamber 46 through the main piston 82. At the same time, the working fluid is also pushed to the compensation chamber 70 through the base valve 100. During the rebound stroke, the piston rod 84 and the main piston 82 move toward the second end 42 of the main tube 34. The working fluid contained in the rebound chamber 46 is compressed and pushed to the compression chamber 44 through the main piston 82.

During the compression stroke and the rebound stroke, because the first predetermined diameter $D_1$ of the first section 48 of the main tube 34 is less than the second predetermined diameter $D_2$ of the second section 50 of the main tube 34, fluid pressure (caused by the compression stroke and the rebound stroke) can build up in the rebound chamber 46. The present invention compensates for the fluid pressure build up by allowing the working fluid and the gas generated to flow from the rebound chamber 46 to the compartment 62 via the at least one orifice 108. Accordingly, the actuator 78 can regulate the fluid flow from the compartment 62 to the compensation chamber 70 to relief fluid pressure build up in the compartment 62. For example, when the actuator 78 is in the extended position, the actuator 78 is in abutment with the aperture 64 to cover the aperture 64 and prevent the working fluid flow from the compartment 62 to the compensation chamber 70. When in the retracted position, the actuator 78 is spaced apart from the aperture 64 thereby establishing fluid communication between the compartment 62 and the compensation chamber 70. It should be noted that the distance $L_1$ between the at least one orifice 108 and the aperture 64 is less than the distance $L_2$ between the aperture 64 and the primary end 58 of the sleeve 36. This reduces fluid travel distance from the compartment 62 to the aperture 64 thereby allowing the actuator 78 to quickly release the fluid pressure in the compartment 62 by moving from the extended position to the retracted position.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims.

What is claimed is:

1. A housing for a damper assembly comprising:
a main tube extending along on a center axis and defining a fluid chamber for containing a working fluid;
said main tube including a first section, a second section, and an intermediate portion, said first section having a first predetermined diameter and said second section having a second predetermined diameter with said second predetermined diameter being greater than said first predetermined diameter, said intermediate portion connecting said first section to said second section at an predetermined angle relative to said center axis;
a sleeve disposed about said main tube and extending along said center axis;
an external tube disposed on said center axis and radially spaced from said sleeve and extending about said main tube and said sleeve; and
said sleeve being in an abutment relationship with said second section of said main tube and radially spaced apart from said first section of said main tube defining a compartment extending between said sleeve and said first section of said main tube,
wherein said sleeve extends between a primary end and a secondary end, said primary end being press-fitted against said first section of said main tube and said secondary end being press-fitted against said second section of said main tube.

2. The housing according to claim 1, wherein said intermediate portion of said main tube defining at least one orifice located on said intermediate portion for allowing fluid communication between said fluid chamber and said compartment.

3. The housing according to claim 2, wherein said at least one orifice includes a plurality of orifices disposed about said center axis and circumferentially spaced from one another.

4. The housing according to claim 3, wherein each orifice of said plurality of orifices is oriented 90° apart from adjacent orifice of said plurality of orifices.

5. The housing according to claim 2, wherein said sleeve defines an aperture in fluid communication with said compartment and located radially spaced from said first section of said main tube; and
wherein a distance between said at least one orifice and said aperture is less than a distance between said aperture and a primary end of said sleeve.

6. The housing according to claim 1, wherein said sleeve is slip-fitted against the second section of the main tube to establish said abutment relationship.

7. A damper assembly comprising:
a main tube extending along on a center axis between a first end and a second end defining a fluid chamber extending therebetween for containing a working fluid;
said main tube including a first section, a second section, and an intermediate portion, said first section having a first predetermined diameter and said second section having a second predetermined diameter with said second predetermined diameter being greater than said first predetermined diameter, said intermediate portion connecting said first section to said second section at an predetermined angle relative to said center axis;
a sleeve disposed about said main tube and extending along said center axis between a primary end and a secondary end, said primary end being adjacent to said first end and said secondary end being adjacent to said second end;
an external tube disposed on said center axis radially spaced from said sleeve and extending about said main tube and said sleeve between a closed end and an opened end with said closed end being adjacent said primary end and said opened end being adjacent to said secondary end, said external tube defining a compensation chamber extending about said center axis between said sleeve and said external tube;
a piston rod guide located at said second end of said main tube and in sealing engagement with said main tube, said sleeve, and said external tube to close said fluid chamber and said compensation chamber;
a main piston slidably disposed in said fluid chamber and movable along said center axis dividing said fluid chamber into a rebound chamber and a compression chamber;
a piston rod extending along said center axis and coupled to said main piston for moving said main piston between a compression stroke and a rebound stroke; and
said sleeve being in an abutment relationship with said second section of said main tube and radially spaced apart from said first section of said main tube defining a compartment extending between said sleeve and said first section of said main tube,
wherein said main tube and said sleeve are press-fitted onto said piston rod guide to establish said sealing engagement.

8. The damper assembly according to claim 7, wherein said intermediate portion of said main tube defining at least one orifice located on said intermediate portion for allowing fluid communication between said fluid chamber and said compartment.

9. The damper assembly according to claim 8, wherein said at least one orifice includes a plurality of orifices disposed about said center axis and circumferentially spaced from one another.

10. The damper assembly according to claim 9, wherein each orifice of said plurality of orifices is oriented 90° apart from adjacent orifice of said plurality of orifices.

11. The damper assembly according to claim 8, wherein said sleeve defines an aperture in fluid communication with said compartment and located radially spaced from said first section of said main tube; and
wherein a distance between said at least one orifice and said aperture is less than a distance between said aperture and said primary end of said sleeve.

12. The damper assembly according to claim 7, wherein said sleeve is slip-fitted against the second section of the main tube to establish said abutment relationship.

13. The damper assembly according to claim 7, wherein said primary end of said sleeve is press-fitted against said first section of said main tube and said secondary end of said sleeve is press-fitted against said second section of said main tube.

14. A damper assembly comprising:
a main tube extending along on a center axis between a first end and a second end defining a fluid chamber extending therebetween for containing a working fluid;
said main tube including a first section, a second section, and an intermediate portion, said first section having a first predetermined diameter and said second section having a second predetermined diameter with said second predetermined diameter being greater than said first predetermined diameter, said intermediate portion connecting said first section to said second section at an predetermined angle relative to said center axis;
a sleeve disposed about said main tube and extending along said center axis between a primary end and a secondary end, said primary end being adjacent to said first end and said secondary end being adjacent to said second end;
an external tube disposed on said center axis radially spaced from said sleeve and extending about said main tube and said sleeve between a closed end and an opened end with said closed end being adjacent said primary end and said opened end being adjacent to said secondary end, said external tube defining a compensation chamber extending about said center axis between said sleeve and said external tube;
a piston rod guide located at said second end of said main tube and in sealing engagement with said main tube, said sleeve, and said external tube to close said fluid chamber and said compensation chamber;
a main piston slidably disposed in said fluid chamber and movable along said center axis dividing said fluid chamber into a rebound chamber and a compression chamber;
a piston rod extending along said center axis and coupled to said main piston for moving said main piston between a compression stroke and a rebound stroke; and
said sleeve being in an abutment relationship with said second section of said main tube and radially spaced apart from said first section of said main tube defining a compartment extending between said sleeve and said first section of said main tube;
said intermediate portion of said main tube defining at least one orifice located on said intermediate portion for allowing fluid communication between said fluid chamber and said compartment;
said sleeve defines an aperture in fluid communication with said compartment and located radially spaced from said first section of said main tube; and
a distance between said at least one orifice and said aperture being less than a distance between said aperture and said primary end of said sleeve,
wherein said main tube and said sleeve are press-fitted onto said piston rod guide to establish said sealing engagement.

15. The damper assembly according to claim 14, wherein said at least one orifice includes a plurality of orifices disposed about said center axis and circumferentially spaced from one another.

16. The damper assembly according to claim 15, wherein each orifice of said plurality of orifices is oriented 90° apart from adjacent orifice of said plurality of orifices.

17. The damper assembly according to claim 14, wherein said primary end of said sleeve is press-fitted against said first section of said main tube and said secondary end of said sleeve is press-fitted against said second section of said main tube.

* * * * *